(12) United States Patent
Nevill-Manning

(10) Patent No.: US 8,255,417 B2
(45) Date of Patent: Aug. 28, 2012

(54) SYSTEM AND METHOD FOR PROVIDING DEFINITIONS

(75) Inventor: Craig Nevill-Manning, New York, NY (US)

(73) Assignee: Google Inc., Mountain View, CA (US)

( * ) Notice: Subject to any disclaimer, the term of this patent is extended or adjusted under 35 U.S.C. 154(b) by 2028 days.

(21) Appl. No.: 10/608,270

(22) Filed: Jun. 27, 2003

(65) Prior Publication Data

US 2004/0236739 A1 Nov. 25, 2004

Related U.S. Application Data

(60) Provisional application No. 60/472,445, filed on May 20, 2003.

(51) Int. Cl.
*G06F 17/30* (2006.01)
*G06F 17/00* (2006.01)
(52) U.S. Cl. ........ 707/770; 707/706; 707/767; 715/259; 715/261
(58) Field of Classification Search .................. 707/770, 707/767, 706; 715/243, 259, 261
See application file for complete search history.

(56) References Cited

U.S. PATENT DOCUMENTS

| | | | |
|---|---|---|---|
| 6,285,999 B1 | 9/2001 | Page | |
| 6,701,309 B1 * | 3/2004 | Beeferman et al. | 707/3 |
| 6,922,809 B2 * | 7/2005 | Coden et al. | 715/531 |
| 2002/0117058 A1 | 8/2002 | Nelson et al. | |
| 2004/0073541 A1 * | 4/2004 | Lindblad et al. | 707/3 |
| 2004/0249801 A1 * | 12/2004 | Kapur | 707/3 |
| 2005/0234709 A1 * | 10/2005 | Klavans et al. | 704/10 |

OTHER PUBLICATIONS

Maurer ("How to get a site listed in Goggle Glossary?", Internet online citation, Jan. 30, 2003, 2 pages retrieved from http://groups.google.com/group/google.public.labs.glossary/browse_thread/thread/53719c13c14dfb7f/c78873b1745039cc?q=glossary&rnum=3#c78873b1.*
Mauer Martin, "How to Get a Site Listed in Google Glossary?" Internet Citation, 'Online!, Jan. 30, 2003, pp. 1-1, XP002302929, google.public.labs.glossary, retrieved on Oct. 27, 2004, p. 1, line 18—p. 1, line 43.
Pfeifer U et al., "Searching Structured Documents With the Enhanced Retrieval Functionality of FreeWAIS-sf and SFgate," Computer Networks and ISDN Systems, North Holland Publishing, Amsterdam. NL vol. 27, No. 6, Apr. 1, 1995, pp. 1027-1036, XP004013204, ISSN: 0169-7552.
Japanese Office Action corresponding to JP 2006-533349, mailed Dec. 15, 2009, 4 pages.
Yvan Cloutier, "Google Glossary", May 24, 2002, p. 1, XP002302930.
Mihalcea et al., "Autoasc—A System for Automatic Acquisition of Sense Tagged Corpora", International journal of Pattern Recognition and Artificial Intelligence, vol. 14, No. 1, Feb. 2000, pp. 3-17, XP000963052.
Yuwono et al., "Searching and Ranking Algorithms for Locating Resources on the World Wide Web", Feb. 26, 1996, pp. 164-171, XP010158912.

* cited by examiner

*Primary Examiner* — Srirama Channavajjala
(74) *Attorney, Agent, or Firm* — Harrity & Harrity, LLP

(57) ABSTRACT

A system and method for providing definitions is described. A phrase to be defined is received. One or more documents, which each contain at least one definition, are determined. The phrase is matched to at least one of the definitions. One or more definitions for the phrase are presented.

36 Claims, 5 Drawing Sheets

SYSTEM AND METHOD FOR PROVIDING DEFINITIONS

CROSS-REFERENCE TO RELATED APPLICATION

This non-provisional patent application claims priority under 35 USC §119(e) to U.S. provisional patent application, Ser. No. 60/472,445, filed May 20, 2003, the disclosure of which is incorporated by reference.

FIELD OF THE INVENTION

The present invention relates in general to providing definitions and, in particular, to a system and method for providing definitions.

BACKGROUND OF THE INVENTION

A system and method for providing definitions is described. There is a vast amount of content available on the Internet. Some of this content is organized in the form of glossaries or definitions. The system and methods described herein allow one to tap into these available resources to quickly and efficiently provide definitions for phrases. "Phrases" may refer to words, phrases, or any other semantic unit that is capable of definition.

SUMMARY OF THE INVENTION

An embodiment provides a system and method for providing definitions. A phrase to be defined is received. One or more documents, which each contain at least one definition, are determined. The phrase is matched to at least one of the definitions. One or more definitions for the phrase are presented.

A further embodiment provides determining definitions from distributed information stores. One or more documents are identified. Each document is maintained in a distributed information store and contains a definition for an associated phrase. Information regarding each identified document is stored. A phrase for which a definition is sought is matched against the stored information for each identified document. Each identified document is fetched from the distributed information store and one or more matching definitions are returned. Each matching definitions is presented.

Still other embodiments of the present invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

BRIEF DESCRIPTION OF THE DRAWINGS

The patent or application file contains at least one drawing executed in color. Copies of this patent or patent application publication with the color drawings will be provided by the Office upon request and payment of the necessary fee.

DETAILED DESCRIPTION

System Overview

Figure 1:
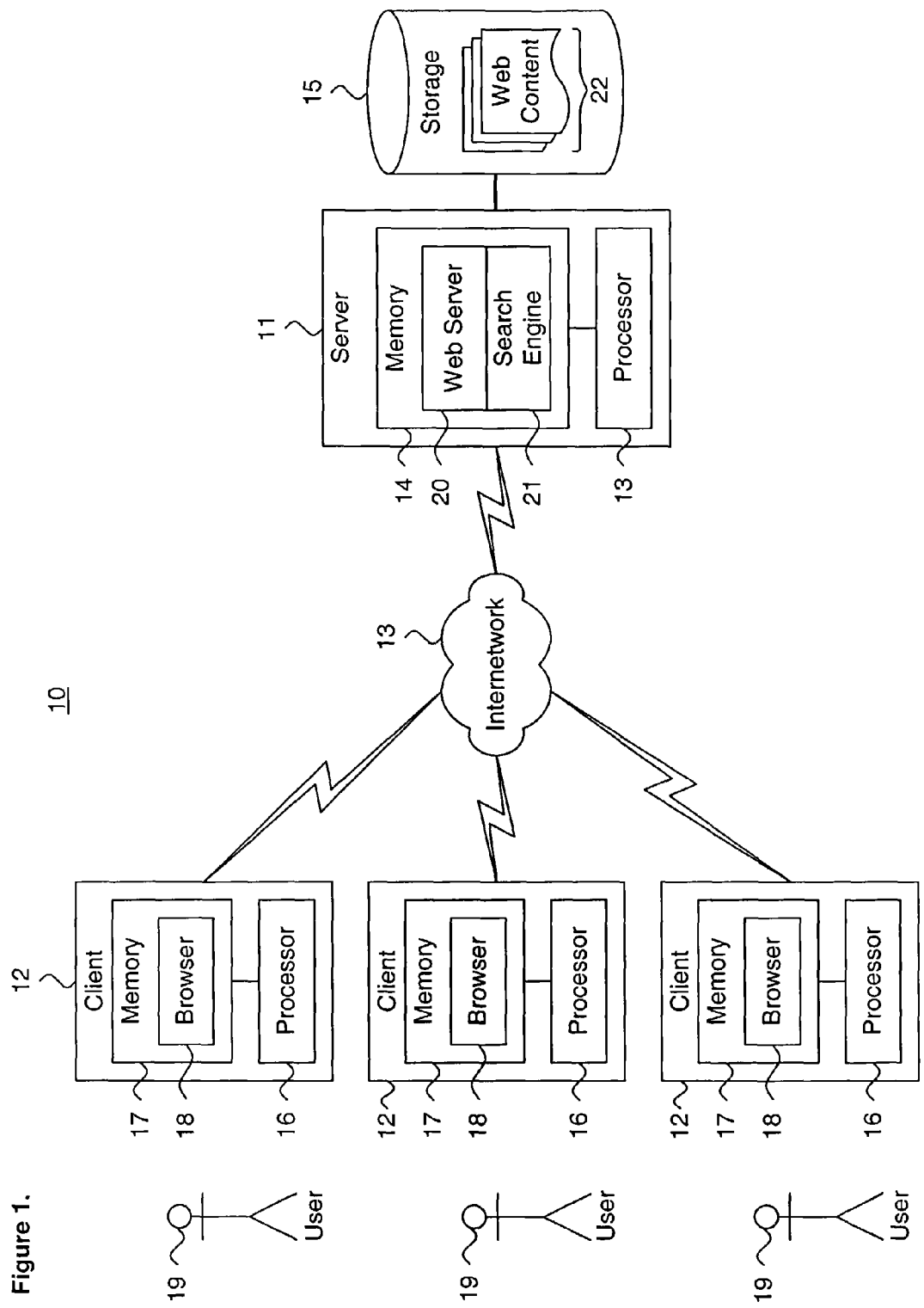
FIG. 1 is a block diagram showing a system for providing definitions, in accordance with the present invention.

FIG. 1 is a block diagram showing a system 10 for providing definitions, in accordance with the present invention. A plurality of individual clients 12 are communicatively interfaced to a server 11 via an internetwork 13, such as the Internet, or other form of communications network, as would be recognized by one skilled in the art. The individual clients 12 are operated by users 19 who transact requests for Web content and other operations through their respective client 12.

In general, each client 12 can be any form of computing platform connectable to a network, such as the internetwork 13, and capable of interacting with application programs. Exemplary examples of individual clients include, without limitation, personal computers, digital assistances, "smart" cellular telephones and pagers, lightweight clients, workstations, "dumb" terminals interfaced to an application server, and various arrangements and configurations thereof, as would be recognized by one skilled in the art. The internetwork 13 includes various topologies, configurations, and arrangements of network interconnectivity components arranged to interoperatively couple with enterprise, wide area and local area networks and include, without limitation, conventionally wired, wireless, satellite, optical, and equivalent network technologies, as would be recognized by one skilled in the art.

For Web content exchange and, in particular, to transact searches, each client 12 executes a Web browser 18 ("Web browser"), which implements a graphical user interface and through which search queries are sent to a Web server 20 executing on the server 11, as further described below with reference to FIG. 2. Each search query describes or identifies information, generally in the form of Web content, which is potentially retrievable via the Web server 20. In addition, the search query can include a phrase for which a definition is sought, as further described below with reference to FIG. 3. The search query provides characteristics, typically expressed as terms, such as keywords and the like, and attributes, such as language, character encoding and so forth, which enables a search engine 21, also executing on the server 11, to identify and send back Web pages. The terms and attributes are a form of metadata, which constitute data describing data. Other styles, forms or definitions of search queries, search query characteristics, and metadata are feasible, as would be recognized by one skilled in the art.

The Web pages are sent back to the Web browser 18 for presentation, usually in the form of Web content titles, hyperlinks, and other descriptive information, such as snippets of text taken from the Web pages. The user can view or access the Web pages on the graphical user interface and can input selections and responses in the form of typed text, clicks, or both. The server 11 maintains an attached storage device 15 in which Web content 22 is maintained. The Web content 22 could also be maintained remotely on other Web servers (not shown) interconnected either directly or indirectly via the internetwork 13 and which are preferably accessible by each client 12.

The search engine 21 preferably identifies the Web content 22 best matching the search query terms to provide high quality Web pages, such as described in S. Brin and L. Page, "The Anatomy of a Large-Scale Hypertextual Search Engine" (1998) and in U.S. Pat. No. 6,285,999, issued Sep. 4, 2001 to Page, the disclosures of which are incorporated by reference. In identifying matching Web content 22, the search engine 21 operates on information characteristics describing potentially retrievable Web content, as further described below with reference to FIG. 2. Note the functionality provided by the server 20, including the Web server 20 and search engine 21, could be provided by a loosely- or tightly-coupled distributed or parallelized computing configuration, in addition to a uniprocessing environment.

The individual computer systems, including server 11 and clients 12, include general purpose, programmed digital computing devices consisting of a central processing unit (processors 13 and 16, respectively), random access memory (memories 14 and 17, respectively), non-volatile secondary storage 15, such as a hard drive or CD ROM drive, network or wireless interfaces, and peripheral devices, including user interfacing means, such as a keyboard and display. Program code, including software programs, and data is loaded into the RAM for execution and processing by the CPU and results are generated for display, output, transmittal, or storage. The Web browser 18 is an HTTP-compatible Web browser, such as the Internet Explorer, licensed by Microsoft Corporation, Redmond, Wash.; Navigator, licensed by Netscape Corporation, Mountain View, Calif.; or a Mozilla or JavaScript enabled browser, as are known in the art.

Computer System Components

Figure 2:
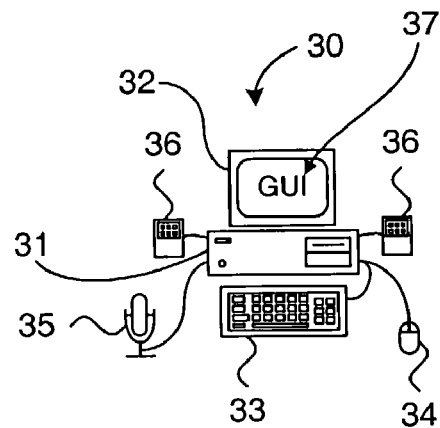
FIG. 2 is a block diagram showing a computer system for use in the system of FIG. 1.

FIG. 2 is a block diagram showing a computer system 30 for use in the system 10 of FIG. 1. The computer system 30 includes a processor 31 and visual display 32, such as a computer monitor or liquid crystal diode (LCD) display, as are known in the art. The computer system 30 executes a Web browser 18 (shown in FIG. 1), which implements a graphical user interface 37. Visual Web content, including retrieved definitions, is output within a display area defined on the graphical user interface 37 while user inputs are generally input both within the display area and within specified user input regions. Textual user inputs are received via a keyboard 33. Linear, non-textual inputs are received via a pointing device 34, such as a mouse, trackball, track pad, or arrow keys. Similarly, voice- and sound-based inputs are received via a microphone 35. Visual outputs are displayed via the graphical user interface 37 on the visual display 32, while audio outputs are played on the speakers 36. Other forms of computer components, including processor 31, visual display 32, and input and output devices could be used, as would be recognized by one skilled in the art.

Method Overview

One embodiment of the present invention will now be described with reference to FIG. 3, which provides a flow diagram showing a method for providing definitions, in accordance with the present invention. The method is described as a sequence of process operations or steps, which can be executed, for instance, by the system of FIG. 1, or equivalent component.

First, a phrase for which a definition is sought is provided (block 41). The phrase may be provided by, for example, a user request or query, or by any other means. One example of a system for providing a phrase is located at the URL identified by http://labs.google.com/glossary, the contents of which are incorporated by reference. In addition, the spelling of the phrase can be corrected if necessary or normalized into a common root form to provide more consistent definition results.

Documents that contain definitions are determined (block 42). These documents may be determined in any number of ways. For example, such documents may be determined during Web-crawling or spidering performed by search engines in either real time or batch processing modes. Once a document is determined to contain definitions, the document (or information about the document, such as the document's URL) may be stored or remembered for future use. "Authoritative" sources for definitions may also be used, for example, documents associated with Web sites, such as the Web site dictionary.com.

In one embodiment of the present invention, documents containing definitions are located substantially in real time, by conducting a query via an Internet search engine. In a further embodiment, the documents are located substantially in a batch processing mode, for example, by fetching, parsing and indexing the documents containing definitions off-line prior to receiving queries. In addition, a combination could be used, such as by providing batch processing for identifying documents containing definitions and using real time processing to fetch, de-duplicate and clean up definitions responsive to each query.

The query may search for terms that are likely to indicate the presence of definitions, such as "glossary," "definition," "dictionary," and so forth, as well as variants and canonicalizations thereof. The search may be conducted over the document text as a whole, or may be restricted to certain portions or fields within documents, such as the title field, fields containing other metadata, and so forth. The structure of documents, that is, the tagged nature of HTML documents, may also be relevant to determining how to structure the query. In an embodiment of the invention, a search for "glossary," "definitions," or "dictionary" in the title of Web pages are used to determine the relevant documents. As will be recognized by one of ordinary skill in the art of information retrieval, the above methods may be combined in various fashions and with numerous other methods to determine definition containing documents.

The phrase for which definition is sought is then matched against the determined documents to return definitions (block 43). The documents determined in this step (block 43) may be parsed to identify occurrences of the phrase being sought and the phrase's associated definition. For example, definition containing documents may be organized with 'headwords," or words that can be looked up in a dictionary form. There are various methods for identifying headwords and/or identifying definitions. In one embodiment of the invention, one or more of the following methods are used to parse apart documents, identify headwords, and/or return definitions:

If the page uses <dl>, <dt> and <dd>, which are HTML tags used for specifying lists of definitions, the HTML mark up is relied upon to identify definitions, that is:

```
An example definition list
<dl>
    <dt>Headword 1
        <dd>This is the definition of Headword 1
    <dt>Headword 2
        <dd>This is the definition of Headword 2
    <dt>Headword 3
        <dd>This is the definition of Headword 3
</dl>
```

HTML tags, such as <p>, <tr>, <li>, and <br>, may be treated as separators between successive definitions.

White space or punctuation (.,:-) is eliminated at the beginning of definitions.

Headwords may be identified by the fact that the headwords are surrounded by the HTML tags <b>, <strong>, <em>, <code>, or <span>.

Lines that do not start with headwords are deleted.

If there are fewer than N, for instance, N=5, definitions found in the document or page, all definitions in the document or page are discarded.

The parser does not need to be perfect at identifying all headwords and definitions. In one embodiment, due to the large number of definition-containing documents determined in the definition document determination step (block 42), the parser is biased towards precision rather than thoroughness. In other words, the parser errs towards throwing entries away rather than keeping entries that may be incorrect because there are more than enough definitions to supply a satisfactory outcome. Similarly, in a further embodiment, the parser de-duplicates entries that are duplicative or merely cumulative of other entries.

One or more of the returned definitions are then provided (block 44). In one embodiment, the returned definitions are ranked according to PageRank™ of the documents from which they are retrieved, according to the methods disclosed in U.S. Pat. No. 6,285,999, cited above. The retrieved definitions may also be processed for presentation, such as by carrying out one or more of the following steps:

Removing:
  all HTML markup;
  leading and trailing white space in both headword and definition;
  all punctuation: (.:;!?-) in the headword;
  all leading non-alpha and non-parenthesis in the headword and definition;
  all trailing non-alphanumeric and non-parenthesis in the headword.

Throw the definition away if:
  the definition starts with "see;
  the definition is a duplicate of one already retrieved.

Capitalize the first letter the definition.

In one embodiment, only definitions whose head phrases are an exact match for the phrase are presented. However, in other embodiments of the invention, a looser form of matching may be allowed.

Other information may also be determined and presented. In one embodiment of the present invention, superstrings of the phrase are tabulated and presented as query refinements or related phrases. Superstrings are strings that contain the phrase (or possibly common variants or canonicalized versions of the phrase). Methods for determining common variants or canonicalized versions of words and phrases are described in, for example, U.S. patent application Ser. No. 10/377,117, entitled "SEARCH QUERIES IMPROVED BASED ON QUERY SEMANTIC INFORMATION," is now U.S. Pat. No. 8,055,669 filed Mar. 3, 2003, pending, and listing Amit Singhal et al. as inventors, which disclosure is incorporated by reference. For example, the top M superstrings may be listed. Similarly, the phrase may be presented in a processed form, such as in the phrase's most common capitalization; for instance, a user query for [pocket pc] or [pocket pcs] may be presented as "Pocket PC" because that is the most common form and/or capitalization found in the definitions.

As will be recognized by one of skill in the art, the steps described above with reference to FIG. 3 need not be performed in the order listed, and steps may be added or removed.

As used in this specification, a "document" is to be broadly interpreted to include any machine readable or machine storable work product. A document may be a file, a combination of files, one or more files with embedded links to other files, and so forth. The files may be of any type, such as text, audio, image, video, and so forth. In the context of the Internet, a common document is a Web page, as is known in the art.

According to a further aspect of the invention, in situations where no definitions are found (or where definitions are not selected for presentation, such as if there is doubt as to whether the definition properly matches the original provided phrase), a set of terms or phrases that are related to the original phrase, that are deemed likely to be related to the phrase, that may be of interest (e.g. of interest to the user entering the original phrase), or even a "random" or eclectic set of terms or phrases for which definitions are returned, may be provided. Such terms may be provided, for example, to give a user a guide as to the types of terms that are defined, or for user amusement.

Sample Web Pages

Figure 3:
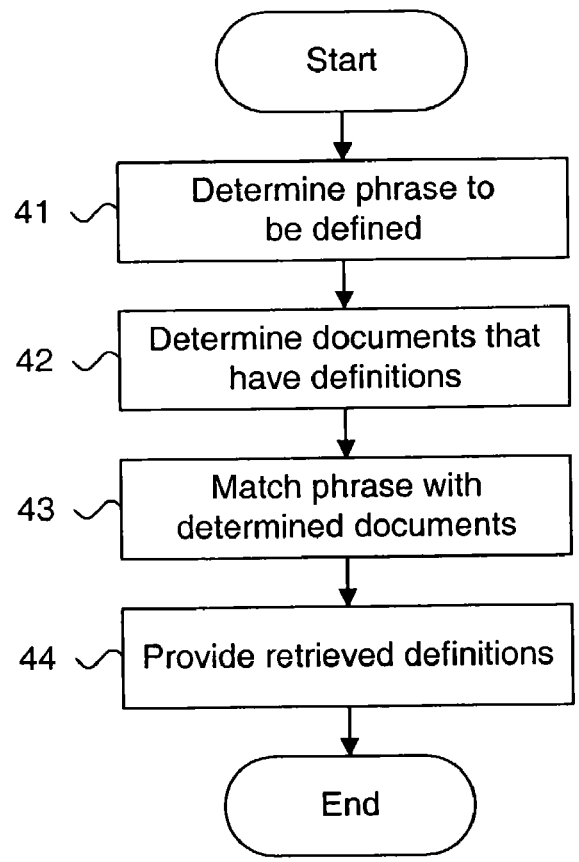
FIG. 3 is a flow diagram showing a method for providing definitions, in accordance with the present invention.
Figure 4:
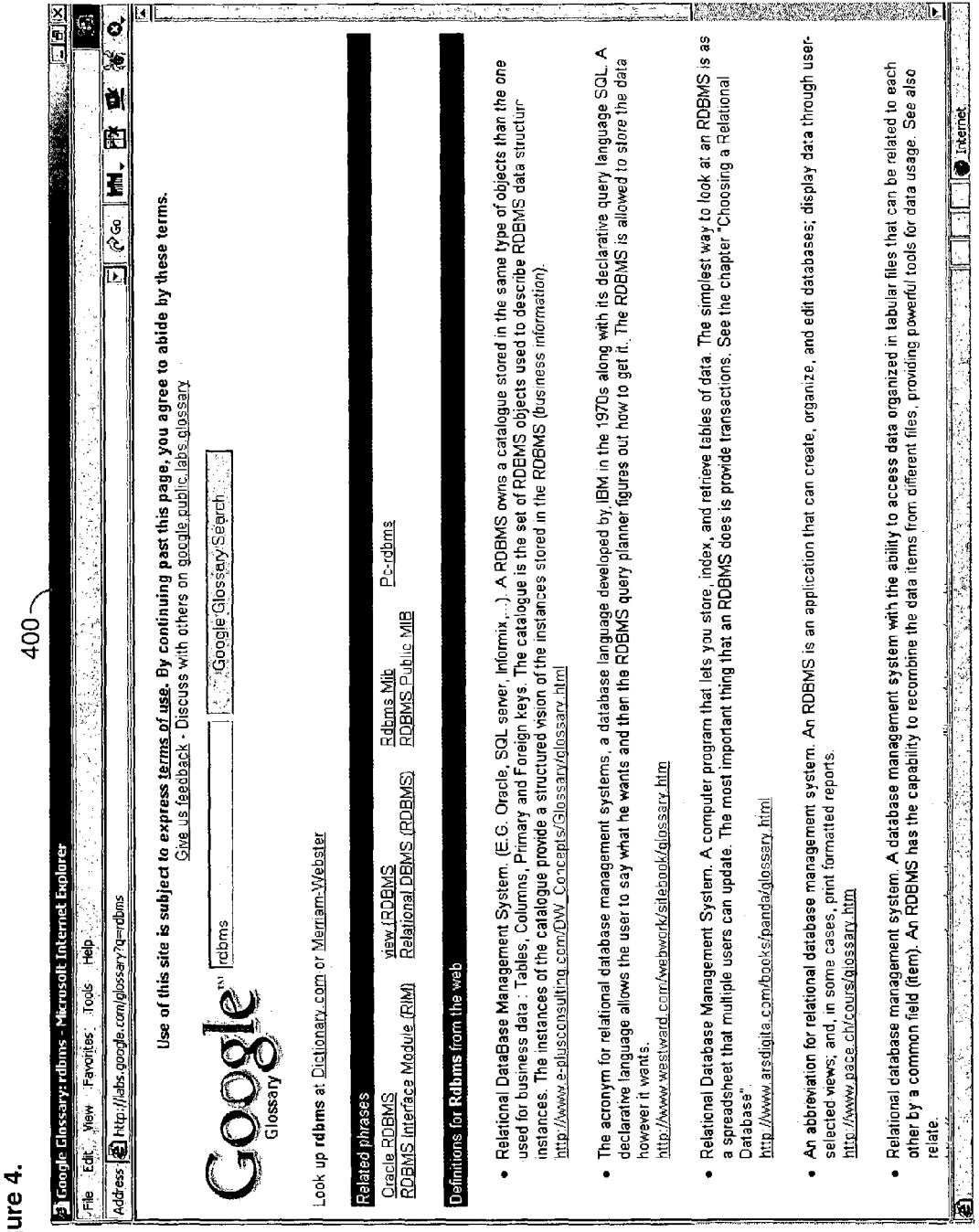
FIG. 4 is a screen shot showing, by way of example, definitions provided by the method of FIG. 3.

FIG. 4 is a screen shot 400 showing, by way of example, definitions provided by the method of FIG. 3. A glossary search for the phrase "rdbms" is provided, substantially as shown.

Figure 5:
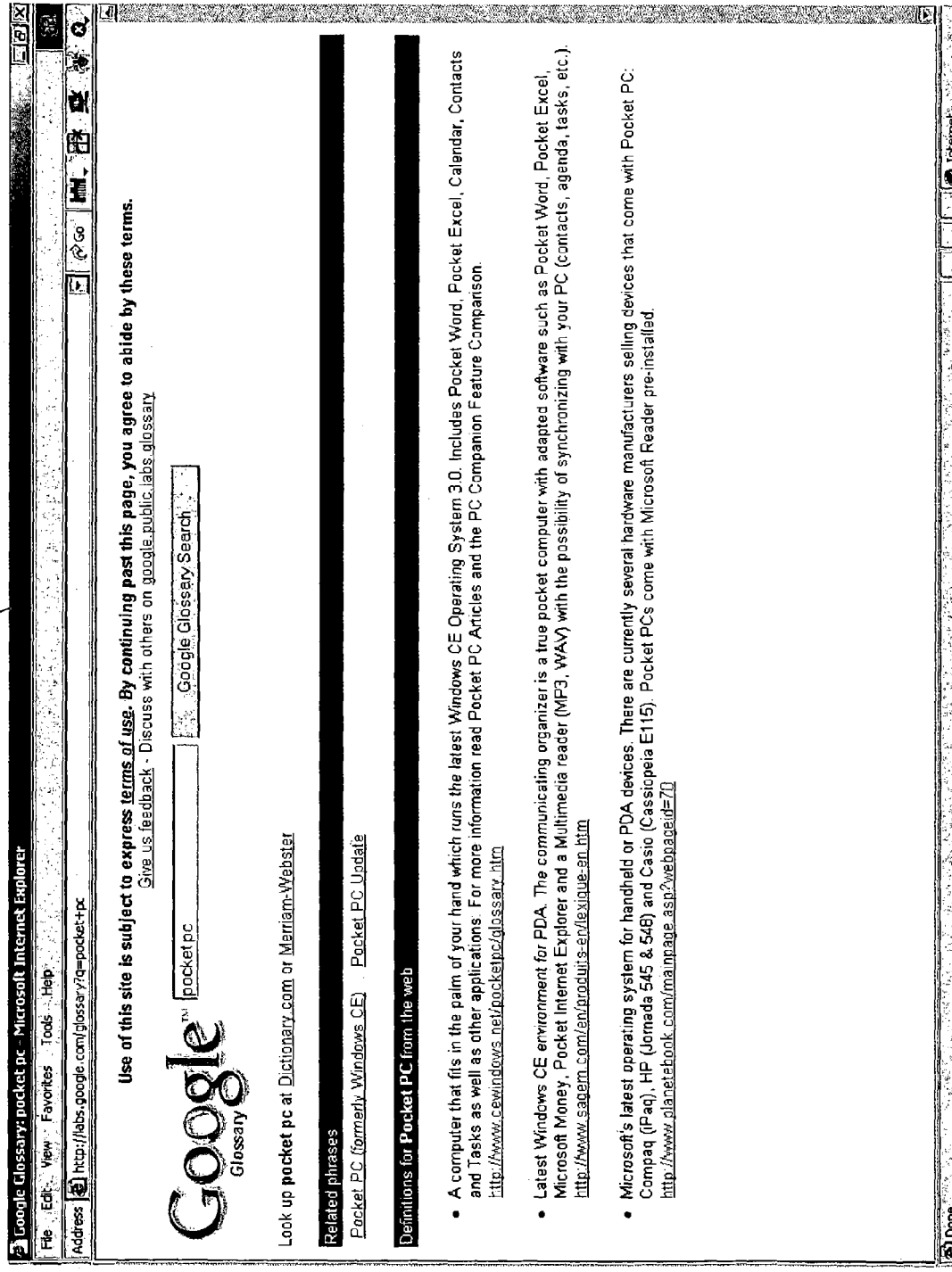
FIG. 5 is a screen shot showing, by way of example, further definitions provided by the method of FIG. 3.

FIG. 5 is a screen shot 500 showing, by way of example, further definitions provided by the method of FIG. 3. A glossary search for the phrase "pocket pc" is provided, substantially as shown.

Figure 6:
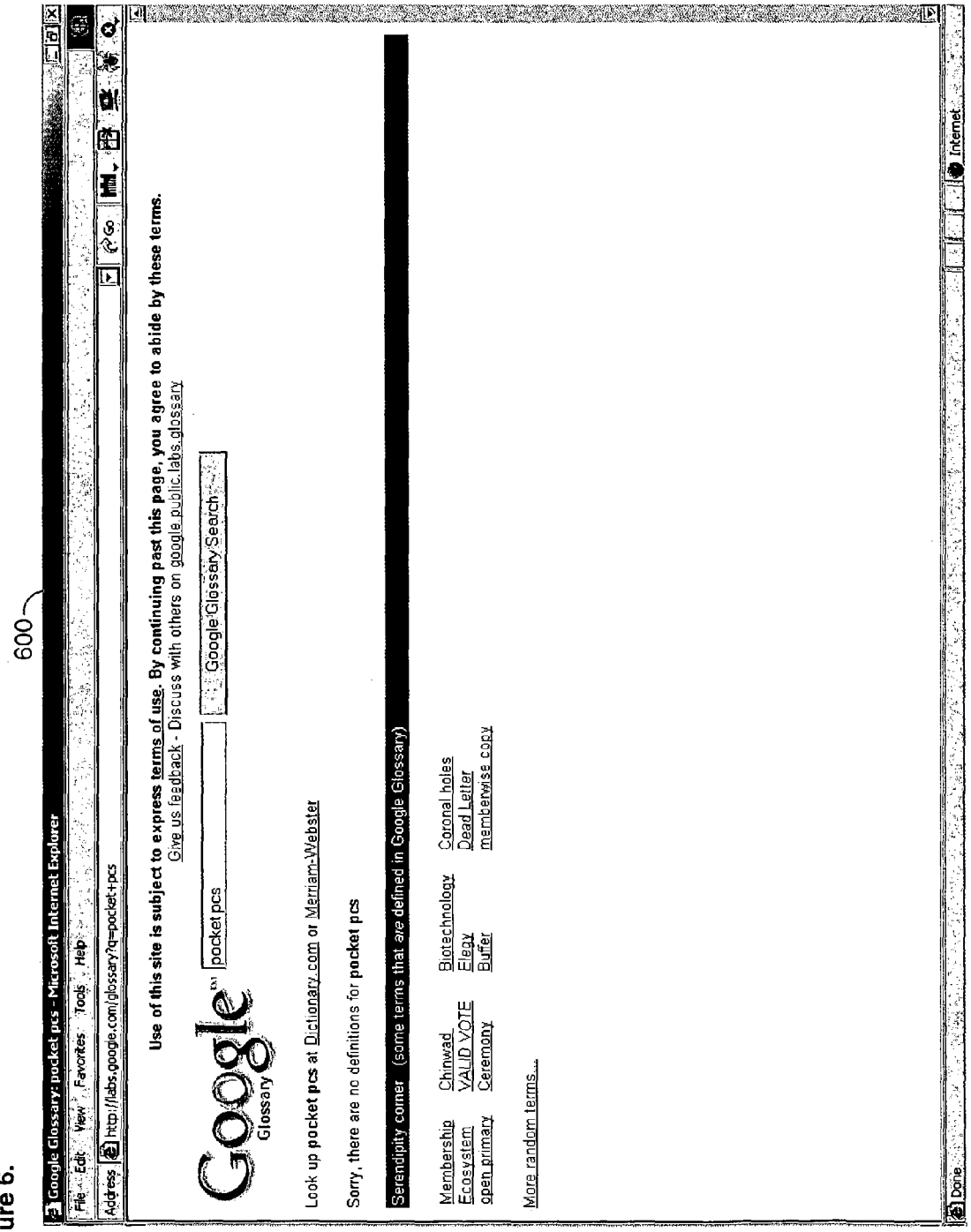
FIG. 6 is a screen shot showing, by way of example, still further definitions provided by the method of FIG. 3.

FIG. 6 is a screen shot 600 showing, by way of example, still further definitions provided by the method of FIG. 3. A glossary search for the phrase "pocket pcs" is provided, substantially as shown.

While the invention has been particularly shown and described as referenced to the embodiments thereof, those skilled in the art will understand that the foregoing and other changes in form and detail may be made therein without departing from the spirit and scope of the invention.

What is claimed is:

1. A system for providing definitions, comprising:
   a server configured to receive a phrase to be processed and select a plurality of documents each containing at least one definition for the phrase, the server, when selecting, being further configured to perform a search based on a search query that includes a predetermined term indicative of a presence of definitions; and a user interface configured to present one or more of the definitions for the phrase in an order determined based on a ranking of the documents that contain the presented one or more definitions.

2. The system of claim 1, wherein selecting the plurality of documents each containing at least one definition is performed prior to the receiving of the phrase.

3. The system of claim 1, wherein the documents are Web pages.

4. The system of claim 1, wherein the predetermined term includes one of glossary, definition, or dictionary.

5. The system of claim 1, wherein the selecting includes performing the search on a title field of the plurality of documents.

6. The system of claim 1, wherein the selecting includes determining a presence of the phrase in the plurality of documents.

7. The system of claim 6, wherein the selecting includes determining an absence of the phrase in the plurality of documents.

8. The system of claim 6, wherein determining the presence of the phrase further includes determining an exact match of the phrase.

9. The system of claim 8, wherein the matching comprises modifying the phrase.

10. The system of claim 9, wherein modifying the phrase comprises determining a canonical form of the phrase.

11. The system of claim 8, wherein the matching further comprises retrieving an associated definition of the phrase.

12. The system of claim 1, wherein the selected documents are determined substantially in real-time in response to the phrase being received from a user.

13. The system of claim 1, wherein the presenting further includes processing the definitions.

14. The system of claim 1, wherein the presenting one or more definitions for the phrase includes presenting a substantially most common capitalization of the phrase.

15. The system of claim 14, further comprising presenting less common forms of the phrase.

16. The system of claim 1, further comprising determining superstrings of the phrase present in the plurality of documents.

17. The system of claim 16, further comprising presenting at least some of the determined superstrings.

18. The system of claim 17, wherein at least one of the presented superstrings is presented as one of a related phrase or a suggested query.

19. A method for providing definitions, comprising:
  receiving a phrase to be processed;
  selecting a plurality of documents each containing at least one definition for the phrase, the selecting including performing a search based on a search query that includes a predetermined term indicative of a presence of definitions; and
  presenting one or more of the definitions for the phrase in an order determined based on a ranking of the documents that contain the presented one or more definitions.

20. The method of claim 19, wherein selecting the plurality of documents each containing at least one definition is performed prior to receiving of the phrase.

21. The method of claim 19, wherein the documents are Web pages.

22. The method of claim 19, wherein the predetermined term includes one of glossary, definition, or dictionary.

23. The method of claim 19, wherein the selecting includes performing the search on a title field of the plurality of documents.

24. The method of claim 19, wherein the selecting includes determining a presence of the phrase in the plurality of documents.

25. The method of claim 24, wherein the selecting includes determining an absence of the phrase in the plurality of documents.

26. The method of claim 24, wherein determining the presence of the phrase further includes determining an exact match of the phrase.

27. The method of claim 24, wherein the selecting comprises modifying the phrase.

28. The method of claim 27, wherein modifying the phrase comprises determining a canonical form of the phrase.

29. The method of claim 19, wherein the selecting further comprises retrieving an associated definition of the phrase.

30. The method of claim 19, wherein the selected documents are determined substantially in real-time in response to the phrase being received from a user.

31. The method of claim 19, wherein the presenting further includes processing the definitions.

32. The method of claim 19, wherein the presenting one or more definitions for the phrase includes presenting a substantially most common capitalization of the phrase.

33. The method of claim 32, further comprising presenting less common forms of the phrase.

34. The method of claim 19, further comprising determining superstrings of the phrase present in the plurality of the documents.

35. The method of claim 34, further comprising presenting at least some of the determined superstrings.

36. The method of claim 35, wherein at least one of the presented superstrings is presented as one of a related phrase or a suggested query.

* * * * *